Aug. 25, 1964  J. H. PARKS  3,145,702
ENGINE SPEED LIMITER CONTROLLED BY LUBRICATING OIL PRESSURE
Filed April 25, 1962
Fig-1-
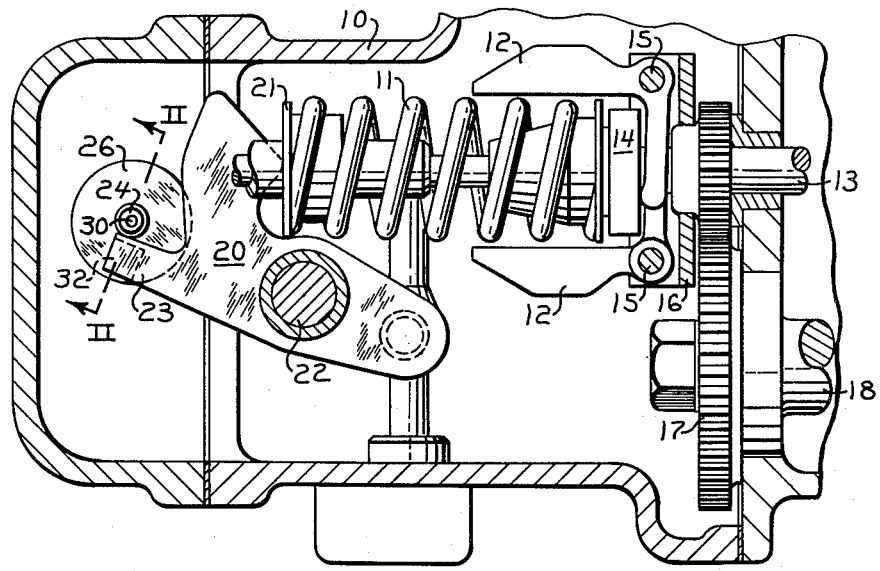
Fig-2-
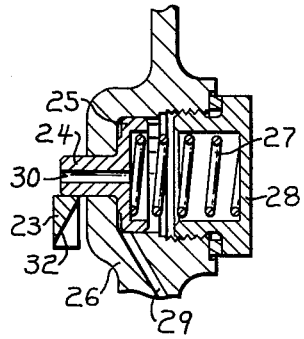
Fig-3-
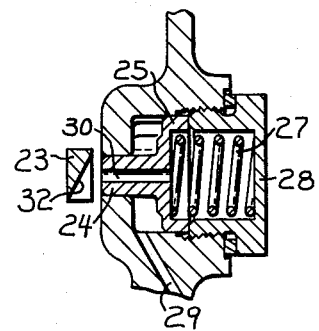
Fig-4-
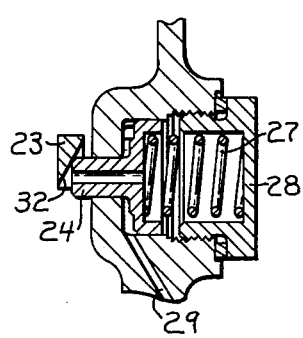
INVENTOR.
JOHN H. PARKS
BY
*Fryer and Zimwald*
ATTORNEYS United States Patent Office 3,145,702
Patented Aug. 25, 1964

3,145,702
ENGINE SPEED LIMITER CONTROLLED BY LUBRICATING OIL PRESSURE
John H. Parks, Peoria, Ill., assignor to Caterpillar Tractor Co., Peoria, Ill., a corporation of California
Filed Apr. 25, 1962, Ser. No. 190,149
3 Claims. (Cl. 123—198)

The present invention relates to controlling the speed of an internal combustion engine when it is started to insure against high speed operation until various bearings and moving parts of the engine are adequately lubricated.

Considerable bearing trouble in engines is experienced as the result of high speed operation when the engine is first started and before adequate lubrication has been supplied to the bearings by the lubricating oil system.

It is the object of the present invention to reduce bearing damage in engines by prohibiting high speed operation until adequate bearing lubrication has been obtained and a further object of the invention is to provide means in conjunction with an engine governor to limit the adjustment of the governor toward its high speed position until pressure in the lubricating oil system of the engine has attained a predetermined value thus indicating that a supply of lubricating oil under pressure has had time to reach the various portions of the engine where lubrication is required.

Further and more specific objects and advantages of the invention are made apparent in the following specification by reference to the accompanying drawing.

In the drawing:

FIG. 1 is a sectional view through a typical engine governor showing only the parts that are necessary to an understanding of the present invention and illustrating the application of the present invention thereto;

FIGS. 2, 3 and 4 are sectional views taken on the line II—II of FIG. 1 showing the parts of the speed limiting device of the present invention in different operative positions.

The governor disclosed in FIG. 1 is of the type fully disclosed in the United States patent to Parks, No. 2,961,229, for "Centrifugal Governor," and as the operation of such governors are well known, only those parts necessary to an understanding of the present invention will be described herein.

The governor mechanism is contained in a housing 10 in which a governor spring 11 and a pair of flyweights 12 function to control the position of a fuel supply regulating member such as a reciprocable rack bar which varies the position of metering pumps in diesel type engines and one end of which is shown at 13 in FIG. 1. The rack bar is reciprocable and urged toward a high speed position or rightwardly as viewed in FIG. 1 by the governor spring 11 which bears against a thrust member 14 secured against axial movement with respect to the rack bar. The flyweights 12 are pivoted as by pins 15 to a carrier 16 rotatable with respect to the rack bar and driven at a speed proportional to engine speed through a conventional gear train shown at 17 to which motion is imparted by means of a cam shaft or other engine driven shaft shown at 18.

Control means for adjusting the load of the governor spring to determine the governed engine speed includes a bifurcated lever, one-half of which is shown at 20 as having one end engaging a seat 21 of the governor spring. Rotation of the lever 20 by means of a conventional governor control lever and linkage, not shown, varies the compression or load of the governor spring 11, the lever being mounted on a shaft 22. Rotation of the lever 20 in a clockwise direction as viewed in FIG. 1 increases the load on the governor spring and the governed speed of the engine.

The lever 20 is, in accordance with the present invention, provided with an extending finger 23 and in the low or starting speed of the engine this finger engages a rod 24 (see also FIG. 2) which prevents adjustment of the lever 20 toward the high speed position. The rod 24 is formed as a part of a piston 25 reciprocably mounted in a cylinder formed within a part 26 of the governor housing. A spring 27 in the cylinder acts between the piston and a spring seat 28 threaded into the opposite end of the cylinder to urge the piston 25 and rod 24 to the extended position shown in FIGS. 1 and 2. This condition prevails when the engine is shut down and no pressure exists in the lubrication oil system. A duct 29 which is in communication with the engine lubrication system, not shown, communicates with the interior of the cylinder at the rod end of the piston 25 so that upon starting of the engine, and the oil pump driven thereby, pressure in the lubrication system sufficient to provide oil to the lubricated parts of the engine enters the cylinder and urges the piston 25 to the position shown in FIG. 3. In this position, the spring 27 is compressed and the rod 24 is retracted from the position where it obstructs the movement of the control lever 20 toward its high speed position. This insures that the engine will not be operated at high speed until its various parts are adequately lubricated. The rod 24 is provided with an orifice 30 communicating through the piston to the spring chamber to insure against a fluid lock in said chamber.

In the event that the engine should stall with the governor set at high speed position, the finger 23 of the lever 20 would be in a position above the rod 24 which would be advanced outwardly by the spring 27 as soon as the lubricating oil pressure failed. This would prevent resetting of the governor to the low speed position for restarting the engine. In order to enable such resetting, the end of the finger 23 is provided with a cam surface 32 which, as shown in FIG. 4, will cause momentary retraction of the rod 24 as the lever 20 is moved in a counterclockwise direction moving the finger downwardly.

While the present invention is illustrated herein in its application to one known form of governor its application to other governors and engine speed control mechanisms will be readily apparent to those skilled in the art from the foregoing description.

I claim:

1. In engine speed control mechanism including a governor and having a governor control element movable between low and high speed positions, means normally positioned to block movement of said element toward high speed position and means actuated by engine oil pressure existing during operation of the engine to retract the blocking means to permit such movement of said element.

2. The combination of claim 1 in which the blocking means is the rod of a piston urged in one direction by a spring and in the opposite direction by engine lubricating oil pressure.

3. The combination of claim 2 in which the speed control element is formed with an inclined surface to engage and retract the piston rod upon movement of the element from a high speed position toward a low speed position.

References Cited in the file of this patent

UNITED STATES PATENTS

| | | |
|---|---|---|
| 2,260,576 | Maybach | Oct. 28, 1941 |
| 2,474,121 | Sanders | June 21, 1949 |
| 2,879,754 | Von Kienlin et al. | Mar. 31, 1959 |